United States Patent [19]

Wehner et al.

[11] 3,793,188
[45] Feb. 19, 1974

[54] PROCESS FOR THE ISOLATION AND SIMULTANEOUS PURIFICATION OF HYDROCARBONS

[75] Inventors: Klaus Wehner, Leuna; Werner Kisan, Halle-Neustadt; Gerhard Esser, Leuna; Gerald Kunz, Merseburg, all of Germany

[73] Assignee: VEB Leuna-Werke "Walter Ulbricht", Legina DDR, Germany

[22] Filed: Apr. 21, 1972

[21] Appl. No.: 246,379

Related U.S. Application Data

[63] Continuation-in-part of Ser. No. 17,907, March 9, 1970, abandoned.

[52] U.S. Cl.............. 208/313, 208/323, 208/324, 208/326, 260/674 SE
[51] Int. Cl............................................ G10g 21/20
[58] Field of Search .......... 208/326, 323, 324, 313; 260/674 SE

[56] References Cited
UNITED STATES PATENTS

| 3,503,875 | 3/1970 | Grigoriu et al. | 208/326 |
| 2,943,122 | 6/1960 | Templeman et al. | 208/326 |
| 3,120,487 | 2/1964 | Morton et al. | 208/326 |
| 3,210,259 | 10/1965 | Cornell et al. | 208/326 |

*Primary Examiner*—Herbert Levine
*Attorney, Agent, or Firm*—Albert C. Nolte, Jr.; Edward B. Hunter; C. Bruce Hamburg

[57] ABSTRACT

In the process of selective extraction and extractive distillation of hydrocarbons, superior results, namely less corrosion, are achieved, if the solvent system is a N-substituted $\epsilon$-caprolactam together with an auxiliary agent, which is water, ethylene glycol, diethylene glycol, or other aliphatic hydrocarbon compound substituted with at least one hydroxy and/or amino group.

7 Claims, No Drawings

PROCESS FOR THE ISOLATION AND SIMULTANEOUS PURIFICATION OF HYDROCARBONS

This is a continuation-in-part of application Ser. No. 17,907, filed Mar. 9, 1970, now abandoned.

This invention relates to a process for the isolation and simultaneous purification of hydrocarbons. More specifically the invention relates to a process for the separation of aromatic hydrocarbons from hydrocarbon mixtures by selective extraction or extractive distillation.

Commercially available hydrocarbon mixtures contain in addition to aromatic hydrocarbons, paraffinic and/or naphthenic hydrocarbons. In view of the increasing demand in modern technology for low-boiling aromatic hydrocarbons, the source generally used up to now, that is coal tar, is inadequate to meet current needs. It has been necessary to turn to other technical mixtures of hydrocarbons, which contain aromatics, for the production of pure aromatic hydrocarbons. These technical mixtures of hydrocarbons are found, for instance, in the low temperature carbonization or hydrogenation of lignite or in the reforming of natural or synthetic gasoline.

The increasing importance of aromatic hydrocarbons in the chemical industry has stimulated the development of many processes for the separation of aromatic hydrocarbons from mixtures of organic substances. In the past, the procedures used for this purpose have been fractionation by distillation, azeotropic distillation, crystallization and adsorption. More recently, extraction processes have been developed, which utilize selective solvents on an industrial scale. Therefore, it is not surprising that many solvents are known which are suitable for the isolation of aromatic hydrocarbons from the mixtures. These solvents are outstanding because of their high selectivity, high capacity, low solubility in the raffinate phase, high density, low viscosity and substantial difference in boiling point from the aromatic hydrocarbons which are to be isolated. These solvents also exhibit great stability to heat and chemicals.

Many solvents have been found to be suitable, for instance diethylene glycol, triethylene glycol and propylene carbonate. Diethylene glycol is discussed in U.S. Pat. No. 2,302,283. See also H.W. Grote, Chem. Engineering Progress, 54 43 et seq. (1958). H. Voetter and W.C.G. Kosters, Erdol and Kohle, 19 (4) 267 et seq. discuss the properties of 1,1-dioxy-tetrahydrothiophene. N-methyl pyrrolidone is discussed in East German Patent No. 47,411; East German Pat. No. 55,104 and by K.H. Eisenlohr, Proc. 6th World Petroleum Congr. Sect. IV p. 25 et seq. (1963).

Monomethylformamide may also be used for this purpose. The properties are described in East German Patent No. 13,661; East German Patent No. 17,802; and by K. Smeykal and M. Kothnig in Chem. Technik 13 403 et seq. (1961). Dimethylformamide, dimethylacetamide and butyrolactam are also appropriate. The properties of morpholine are described by E. Cinelli, P.L. Girotti and R. Tesei, Proc. 6th World Petroleum Congress, Sec. IV, p. 45 et seq. (1963).

Other suitable solvents are piperazine, dimethylsulfoxide, (C. Raimbault, B. Choffe, F.P. Navarre and M. Lucas, Erdol und Kohle, 21 (5) 275 et seq. (1968)furfurol, ketodioxane, mono-, di, and triethanolamine and others.

These solvents are often considerably different one from the other with respect to the properties which are expected from ideal solvents. In this manner, for the most part, solvents with high selectivity are characterized by their low stability to heat and chemicals. On the other hand, solvents with high stability to heat and chemicals, for the most part, exhibit only a low degree of selectivity.

It is also known that it is possible to cause an increase in selectivity with solvents of high capacity, which frequently are characterized by high stability to heat, by the use of auxiliary agents. Suitable auxiliary agents are water, ethylene glycol, diethyleneglycol, and other aliphatic hydrocarbon compounds substituted with at least one hydroxyl or amino group.

With the application of these mixtures, however, the chemical stability of the solvents has become an important problem, because the effect of water or other hydroxycontaining compounds with the solvents frequently leads to chemical changes of these substances or causes corrosion to a smaller or greater degree. The result is that the equipment, either in its entirety or in certain parts which are particularly exposed to dangerous conditions must be provided with partitions made of specially resistant alloys. Manifestly, these equipment requirements substantially raise the operational cost.

Essentially the difficulty has been in finding a solvent or a solvent mixture which exhibits simultaneously good capacity or good selectivity and good chemical stability and which, in mixture with the auxiliary agents, is substantially less corrosive than the solvents used so far together with the auxiliary agents.

An object of this invention is to provide a process for the isolation and simultaneous purification of hydrocarbons, particularly aromatic hydrocarbons from mixtures of hydrocarbons which contains also paraffinic and/or naphthenic hydrocarbons, by selective extraction or extractive distillation, while simultaneously avoiding the drawbacks of the known processes.

The crux of this invention resides in the finding that, for the preparation of pure hydrocarbons particularly aromatic hydrocarbons by selective extraction or extractive distillation, it is possible to use as the selective solvent a N-substituted $\epsilon$-caprolactam provided that it is used in admixture with water or an aliphatic hydrocarbon compound substituted with at least one hydroxyl or amino group as an auxiliary agent.

Suitable selective solvents are, for instance, $\epsilon$-caprolactams in which the nitrogen atom of the lactam ring is substituted with alkyl, cyanoalkyl, hydroxyalkyl, or alkoxyalkyl. These N-substituted $\epsilon$-caprolactams optionally may carry substituents on at least one carbon atom of the lactam ring.

According to the invention, the required selectivity is provided, by using the solvents in combination with auxiliary agents. It has been found that water, ethylene glycol, diethyleneglycol and other aliphatic hydrocarbon compounds substituted with one or more hydroxyl and/or amino groups, are suitable auxiliary agents, constituting preferably from 15 to 70% by volume of the solvent mixture. The aforementioned other aliphatic hydrocarbon compounds include mono-, di- and triethanolamine, iso-propanolamine, diglycolether, glycerine, hydrazine, ethylenediamine, diethylenetriamine.

Particularly advantageous as the auxiliary agent is water, preferably in the proportion 15 to 50% by volume, most preferably 15 to 40%, based upon the mixture of solvents. Ethylene glycol is also suitable for this purpose in the proportion 15 to 70% by volume of the solvent mixture.

Suitable selective solvents are the N-alkyl-ε-caprolactams, and particularly the compounds containing alkyl groups containing between one and four carbon atoms. The alkyls in N-cyanoalkyl-ε-caprolactams and N-hydroxyalkyl caprolactams employed according to the invention also are preferably from one to four carbon atoms. Particularly advantageous is the incorporation of N-methyl-ε-caprolactam. The solvent combination of N-methyl-ε-caprolactam and water or ethylene glycol is particularly appropriate. According to another preferred embodiment of the invention, N-cyanoalkyl-ε-caprolactams are used, and particularly N-(β-cyanoethyl)-ε-caprolactam.

Suitable starting materials for obtaining pure aromatic hydrocarbons are reformed gasoline, condensates from the pyrolysis, cracked and straight-run gasoline, occuring in considerable quantities on an industrial scale. Also liquid fractions from the coking of lignite or coal, from the hydrogenation of petroleum or from tar processing may be used.

The starting materials may also be purified in known fashion, for instance by refining by catalytic hydrogenation, or by preliminary treatment with fuller's earth or other known methods.

For the purpose of avoiding an unnecessary load on the extraction apparatus, it is advantageous to introduce into the apparatus only the portion of the hydrocarbon mixture, of boiling range as the desired aromatics. More specifically, it is advantageous to remove by distillation the fraction boiling below 70°C and the material boiling above 160°C, so that only the fraction boiling between 70°C and 160°C is introduced in the extraction apparatus.

The simplest manner of conducting the extraction, in general, is in accordance with the conventional liquid - liquid extraction in extraction columns. It is also possible, however, to use instead of a column, a series of stirring vessels, with separation vessels interposed between them and which are operated countercurrently. It should be stressed, however, that the application of the solvents in accordance with the invention is not limited to a determined technological form of construction, but, it is suitable, in general, with all known processes for the extraction or extractive distillation.

The extraction may be conducted with the solvents according to this invention at normal temperature or also at moderately higher temperature. The efficacy of the extraction may be increased, in known fashion, by recycling a part of the pure aromatics which are formed, so that an increase in concentration of aromatics is achieved. In this manner, the purity of the mixture of aromatics being isolated is increased. In order to improve the results of the extraction, it is advantageous also to incorporate substances of boiling point substantially outside the boiling range of the aromatics to be isolated, and which are not miscible with the solvent and which are little soluble or insoluble in it. These substances act in opposition to the solvents. It is also possible to recycle a fraction which is a mixture of aromatics and non-aromatics.

The extracts which are abtained consist of the solvent mixture and the aromatics. They are fractionated in known fashion by distillation. In this manner the solvent may be continuously recycled into the extraction process. The mixture of aromatics so obtained may be further fractionated by distillation into the individual components.

The raffinate, consisting mainly of non-aromatics, after removal of small amounts of solvents, for instance by means of a water washing, may be used in a variety of applications. It may also be advantageous if, for the separation of the mixture of aromatics and non-aromatics, a combination of liquid - liquid extraction and extractive distillation are used.

The solvents in accordance with this invention, exhibit a very high stability to heat as well as good stability to chemicals, in the presence of the aforementioned auxiliary agents. The corrosive action of the solvent systems is simultaneously substantially reduced.

Studies on the corrosive action of a mixture of N-methyl-ε-caprolactam and water, for a period of 28 days at 100°C., on an iron boiler (the boiler plate consisting of carbon steel C 15) enabled ascertainment of the expected linear yearly corrosion and comparison of it with the values obtained with known mixtures of solvents, containing water, under similar conditions.

Table 1 below sets forth in values for the corrosive action with the solvents listed therein, together with the specified proportion of water expressed as a percentage of the total volume of the mixture.

Table 1

| Solvent | Corrosive Attack in mm, per year | Remarks |
|---|---|---|
| N-methyl +25% H₂O ε-caprolactam | 0.01 | Slight punctiform corrosion |
| N-(β-cyanoethyl)—ε—caprolactam +20% H₂O | 0.09 | Punctiform corrosion |
| N-methyl pyrrolidone 25% H₂O | 0.32 | Stronger surface attack |
| Monoethylformamide 10% H₂O | 2.11 | Surface attack and strong grained corrosion |

Obviously the high chemical stability of the solvent mixtures in accordance with this invention, accounts for their low corrosive action and constitutes a substantial advantage over the processes known in the art.

Table 2 lists the physical properties of three of the solvents within the scope of the process of this invention.

The solvents, in accordance with this invention, in view of their high boiling point, are suitable for a variety of applications. Another advantage of their high boiling point is that the fractionation of the aromatics in the extract by distillation, may be smoothly carried out.

The solvents mentioned above exhibit high capacity for aromatics and their selectivity strongly increases as a result of the addition of auxiliary agents. Another advantage of the solvents used in the process of this invention is that they may easily and inexpensively be prepared from starting materials such as crude ε-caprolactam, ε-caprolactone, cyclohexanone, as well as alcohols, alkylamines, acrylonitriles, ethylene oxide, etc.

The following examples are described hereinbelow in detail, for the purpose of further illustrating the invention. Proportions are by volume.

Table 2

Physical Properties

| Property | Solvents | | |
|---|---|---|---|
| | N-methyl ε-caprolactam | N-ethyl ε-caprolactam | N(-β-cyano-ethyl) ε-caprolactam |
| b.p. | 105–106°C/10 mm | 123–124°C/15mm | 174–175°C/10 mm |
| density $d_4^{25}$ | 1.0154 | 0.986 | 1.074 |
| refractive index: $N_D^{25}$ | 1.4810 | 1.4775 | 1.4895 |

EXAMPLE 1

A mixture of 50% by volume of benzene and 50% of n-hexane, was intensively mixed at room temperature with four times its volume of a mixture consisting of 75% of N-methyl-ε-caprolactam and 25% of water. After 30 minutes, two phases quickly separated and the separation of benzene and n-hexane in the two phases was ascertained by analytical methods. The results of the separation are reported in the table below. The data all in the following tables under a) represent the content in %, based upon the volume of hydrocarbons used, while the data under b) represent the absolute volume, in %, in the two phases, free of solvent.

Table 3

| Raffinate | | | | Extract | | | |
|---|---|---|---|---|---|---|---|
| Hexane | | Benzene | | Hexane | | Benzene | |
| a) % | b) Vol.% | a) % | b) Vol.% | a) % | b) Vol.% | a) % | b) Vol.% |
| 83.4 | 74.3 | 24.6 | 25.7 | 16.6 | 18.1 | 75.4 | 82.0 |

EXAMPLE 2

A mixture of benzene and n-hexane in the same proportion as in Example 1, was shaken at room temperature with four times its volume of a mixture prepared from 60% of N-methyl-ε-caprolactam and 40% of glycol. The separation of the hydrocarbons in the raffinate and in the extract respectively took place as reported in Table 4 below.

Table 4

| Raffinate | | | | Extract | | | |
|---|---|---|---|---|---|---|---|
| Hexane | | Benzene | | Hexane | | Benzene | |
| a) % | b) Vol. % | a) % | b) Vol. % | a) % | b) Vol. % | a) % | b) Vol. % |
| 54.0 | 84.5 | 19.8 | 15.5 | 46.0 | 33.3 | 80.2 | 66.8 |

EXAMPLE 3

A mixture of benzene and n-hexane in the same proportion as in Example 1, was shaken at room temperature with four times its volume of a mixture prepared from 50% of N-methyl-ε-caprolactam and 50% of glycerine. The separation of the hydrocarbons in the raffinate and in the extract respectively took place as reported in Table 5 below.

Table 5

| Raffinate | | | | Extract | | | |
|---|---|---|---|---|---|---|---|
| Hexane | | Benzene | | Hexane | | Benzene | |
| a) % | b) Vol. % | a) % | b) Vol. % | a) % | b) Vol. % | a) % | b) Vol. % |
| 86.3 | 70.8 | 27.7 | 29.2 | 13.7 | 15.5 | 72.3 | 84.5 |

EXAMPLE 4

A mixture of benzene and n-hexane in the same proportion as in Example 1, was shaken at room temperature with four times its volume of a mixture prepared from 50% of N-methyl-ε-caprolactam and 50% of ethanolamine. The separation of the hydrocarbons in the raffinate and in the extract respectively took place as reported in Table 6 below.

Table 6

| Raffinate | | | | Extract | | | |
|---|---|---|---|---|---|---|---|
| Hexane | | Benzene | | Hexane | | Benzene | |
| a) % | b) Vol. % | a) % | b) Vol. % | a) % | b) Vol. % | a) % | b) Vol. % |
| 39.5 | 82.0 | 3.1 | 18.0 | 60.5 | 37.3 | 96.9 | 62.7 |

EXAMPLE 5

A mixture of benzene and n-benzene in the same proportion by volume as in Example 1, was shaken at room temperature with four times its volume of a mixture from 65% of N-ethyl-ε-caprolactam and 35% of water. The separation of the hydrocarbons in the raffinate and in the extract was as follows:

Table 7

| Raffinate | | | | Extract | | | |
|---|---|---|---|---|---|---|---|
| Hexane | | Benzene | | Hexane | | Benzene | |
| a) % | b) Vol. % | a) % | b) Vol. % | a) % | b) Vol. % | a) % | b) Vol. % |
| 85.4 | 63.8 | 45.6 | 36.2 | 14.6 | 19.5 | 54.4 | 80.5 |

EXAMPLE 6

A mixture of benzene and n-hexane in the same proportion as in Example 1, was shaken at room temperature with four times its volume of a mixture prepared from 80% of N-hydroxymethyl-ε-caprolactam and 20% of water. The separation of the hydrocarbons in the raffinate and in the extract was as follows:

Table 8

| Raffinate | | | | Extract | | | |
|---|---|---|---|---|---|---|---|
| Hexane | | Benzene | | Hexane | | Benzene | |
| a) % | b) Vol. % | a) % | b) Vol. % | a) % | b) Vol. % | a) % | b) Vol.% |
| 90.6 | 69.7 | 30.2 | 30.3 | 9.4 | 10.3 | 69.8 | 89.7 |

EXAMPLE 7

A mixture of benzene and n-hexane in the same proportion as in Example 1, was shaken at room temperature with four times its volume of a mixture prepared from 80% of N-ethoxymethyl-ε-caprolactam and 20% of water. The separation of the hydrocarbons in the raffinate and in the extract was as follows:

Table 9

| Raffinate | | Extract | |
|---|---|---|---|
| Hexane | Benzene | Hexane | Benzene |
| a) 50.3% b) 70.3 Vol.% | a) 13.7% b) 29.7 Vol.% | a) 49.7% b) 36.5 Vol.% | a) 86.3% b) 63.5 Vol.% |

The results of Examples 1 to 7 unquestionably demonstrate that the solvents within the scope of this invention have significant extractive power for aromatic hydrocarbons. In every instance, even with a single-stage operation, a substantial concentration of benzene in the extract is found. The results with the single-stage operation have warranted the application of the process in accordance with this invention for the selective extraction of aromatics from mixtures containing non-aromatics, by a multiple-stage process.

EXAMPLE 8

A mixture of hydrocarbons, of boiling range 60°–95° C, consisting of 58.7% of benzene, 4.1% toluene and 37.2% of paraffinic and naphthenic non-aromatics, was extracted with a solvent mixture of 70% by volume of N-methyl-ε-caprolactam and 30% of water, in an extraction column of conventional design. The hydrocarbon mixture was fed at about the middle of the column, while the solvent mixture in a volume four times the volume of the hydrocarbon mixture, was fed into the upper part of the column. The solvent passed through the column countercurrently to the hydrocarbons and the concentration of aromatics in the solvent became progressively greater. Provision was made for recycling the aromatic fraction at a point a little above the outlet for the extract phase. The fraction recycled was a mixture of benzene and toluene and was free of non-aromatics. The amount was about the same as the mixture originally introduced.

The solvent, which contained aromatics, was led into a stripper column, in which all the aromatics were distilled off from N-methyl-ε-caprolactam together with a part of water. The mixture of aromatics and water which condensed on cooling, was separated in a separator. The mixture of aromatics, of purity above 99%, partly was fractionated by distillation into benzene and toluene and was partly recycled in the extractor. The solvent, freed from the aromatics, was restored to its original composition by the addition of water and passed again in the extraction column for further use. The non-aromatic fraction, freed from the aromatics, was drawn off as the overhead and constituted the raffinate. The raffinate contained only 2% of aromatics and a small amount of solvent, about 1%. After washing countercurrently with water, in a small extraction column, the N-methyl-ε-caprolactam was removed and was added again to the solvent in the extraction column.

EXAMPLE 9

A hydrocarbon mixture of the same composition as in Example 10 was extracted with 3.5 times its volume of a mixture of 55 volumes % of N-methyl-ε-caprolactam and 45% of glycol. There was obtained a raffinate which was free of aromatics.

The extract, which still contained 14.7% of non-aromatics, was led into a distillation column, where the non-aromatics came off as a head-product, together with a small quantity of aromatics. This head product was partly recycled in the distillation column and partly reconveyed for refluxing in the extraction unit. The sump material from the distillation column was free of non-aromatics and was separated in a second column into an overhead fraction, which was a mixture of benzene and toluene and a sump material, which consisted of the solvent mixture free from aromatics. The solvent was brought back to the extraction apparatus and the benzene-toluene mixture, after another distillation, was fractionated to give the pure hydrocarbons. In this manner, practically the entire aromatic fraction present in the starting material was fractionated to give the pure components.

What is claimed is:

1. A process for the separation of a mixture of aromatic, aliphatic and naphthenic hydrocarbons, wherein the mixture is subjected to selective extraction or extractive distillation with a mixture consisting essentially of a N-substituted $\epsilon$-caprolactam selected from the group consisting of N-alkyl-$\epsilon$-caprolactam, N-cyanoalkyl-$\epsilon$-caprolactam, N-hydroxyalkyl-$\epsilon$-caprolactam and N-alkoxyalkyl-$\epsilon$-caprolactam in which each alkyl is of one to four carbon atoms, as a solvent, and at least one auxiliary agent selected from the group consisting of water, ethylene glycol, diethylene glycol, monoethanolamine, diethanolamine, triethanolamine, isopropanolamine, diglycolether, glycerine, hydrazine, ethylenediamine and diethylenetriamine, the proportion by volume of the auxiliary agent in the mixture being 15 to 70%.

2. The process according to claim 1 wherein the auxiliary agent is water in the proportion of 15 to 50% by volume of the mixture of the solvent and the water.

3. The process according to claim 2 wherein the auxiliary agent is water in the proportion of 15 to 40% by volume of the mixture of the solvent and the water.

4. The process according to claim 1 wherein the auxiliary agent is ethylene glycol.

5. The process according to claim 1 wherein the hydrocarbon mixture being fractionated by extraction and extractive distillation boils between 70° and 160°C.

6. The process according to claim 1 wherein the solvent is N-methyl-$\epsilon$-caprolactam.

7. The process according to claim 6, wherein the auxiliary agent is water or ethylene glycol.

* * * * *